United States Patent
Lane et al.

(10) Patent No.: US 9,536,678 B2
(45) Date of Patent: Jan. 3, 2017

(54) STABILITY ENHANCING ADDITIVE FOR ELECTROCHEMICAL DEVICES

(71) Applicant: Ioxus, Inc., Oneonta, NY (US)

(72) Inventors: George Lane, St. Helens (AU); Ken Rudisuela, Grimsby (CA)

(73) Assignee: IOXUS, INC., Oneonta, NY (US)

( * ) Notice: Subject to any disclaimer, the term of this patent is extended or adjusted under 35 U.S.C. 154(b) by 90 days.

(21) Appl. No.: 14/317,718

(22) Filed: Jun. 27, 2014

(65) Prior Publication Data
US 2015/0016021 A1    Jan. 15, 2015

Related U.S. Application Data

(60) Provisional application No. 61/845,404, filed on Jul. 12, 2013.

(51) Int. Cl.
| | |
|---|---|
| H01G 11/60 | (2013.01) |
| H01G 11/84 | (2013.01) |
| H01G 11/64 | (2013.01) |

(52) U.S. Cl.
CPC .......... *H01G 11/60* (2013.01); *H01G 11/64* (2013.01); *H01G 11/84* (2013.01); *Y02E 60/13* (2013.01); *Y10T 29/417* (2015.01)

(58) Field of Classification Search
CPC ........ H01G 9/035; H01G 11/64; H01G 11/60; H01G 11/84
See application file for complete search history.

(56) References Cited

U.S. PATENT DOCUMENTS 4,528,254 A * 7/1985 Wolf .................. H01M 4/60
429/213
9,190,695 B2 * 11/2015 Okamoto .......... H01M 10/0567
(Continued)

FOREIGN PATENT DOCUMENTS

| WO | WO 2012/017998 | * 2/2012 |
| WO | WO 2015/006072 | 1/2015 |

OTHER PUBLICATIONS

Abstract for KR 20110136085A, Dec. 21, 2011.*

(Continued)

*Primary Examiner* — Carol M Koslow
(74) *Attorney, Agent, or Firm* — Cooley LLP

(57) ABSTRACT

Embodiments described herein relate generally to electric double layer capacitors having an electrolyte formulation that includes a quantity of a stabilizing additive such that the electrochemical double layer capacitors retain cell capacitance for longer periods of time, generate less gas during operation, and experience less long term ESR. In some embodiments, an electrolyte formulation includes an ionic species, a solvent, and a stabilizer. In some embodiments the stabilizer contains a moiety that promotes adsorption to a surface, such as a carbon surface, and a moiety that promotes polarity of the stabilizer. In some embodiments, the solvent can be a nitrile compound and the stabilizer can be a compound of the formula I:

(Continued)

Such that R is H, saturated or unsaturated, linear or branched, acyclic carbon group, OH, halogen $NH_2$, $NO_2$, $S(O)_2CF_3$, or monocyclic or polycyclic aryl, and n is an integer from 0 to 5.

49 Claims, 7 Drawing Sheets

(56) References Cited

U.S. PATENT DOCUMENTS

| | | |
|---|---|---|
| 2006/0274475 A1 | 12/2006 | Chiba |
| 2009/0134851 A1 | 5/2009 | Takeda et al. |
| 2012/0156528 A1 | 6/2012 | Cooley |
| 2013/0133923 A1 | 5/2013 | Leis et al. |

OTHER PUBLICATIONS

International Search Report and Written Opinion for International Application No. PCT/US2014/044585, mailed Oct. 14, 2014, 9 pages.

* cited by examiner

STABILITY ENHANCING ADDITIVE FOR ELECTROCHEMICAL DEVICES

CROSS REFERENCE TO RELATED APPLICATIONS

This application claims priority to and the benefit of U.S. Provisional Patent Application Ser. No. 61/845,404, filed Jul. 12, 2013, entitled, "Stability Enhancing Additive for Electrochemical Devices," the disclosure of which is incorporated herein by reference in its entirety.

BACKGROUND

Embodiments described herein relate generally to electric double layer capacitors having an electrolyte formulation that includes a stabilizing additive such that the electric double layer capacitor retains its cell capacitance for longer periods of time, and ESR gain and gas generation are reduced during operation of the cell.

Electric double layer capacitors (EDLCs) which are also referred to as ultracapacitors or supercapacitors, generally enable fast delivery of electrical energy in a short period of time. Thus, EDLCs are well suited for high power applications such as, for example, PC cards, CF cards, mini PCI, express cards, USB modems, toll tags, energy backup in portable or energy constrained devices (e.g., UPS), voltage regulation for CPU's, supplemental power in hybrid electric vehicles, portable audio and other devices with high surge loads, actuators for door lock, LED flash cameras, solid state memory devices, and other devices requiring high power and high energy. In particular, EDLCs can be used as an integral energy storing component of the drive trains of hybrid electric vehicles. Known hybrid electric vehicles use EDLCs as the primary power source during acceleration and for storage of energy during regenerative breaking.

EDLCs include an anode and a cathode (e.g., carbon based anode and carbon based cathode) that are separated by a separator. The EDLC is infiltrated with an electrolyte such as, for example, an aqueous electrolyte (e.g., sulfuric acid solutions, potassium hydroxide solutions, etc.) or a non-aqueous electrolyte. Known electrolytes typically include an aqueous or non-aqueous solvent which contains one or more dissolved ionic species. Known electrolytes such as, for example, aqueous electrolytes can be unstable at normal operating conditions of the EDLC. An additive, for example, a stabilizer can be added to such known unstable electrolytes to stabilize the electrolyte for operation at normal EDLC working conditions.

Known EDLCs also use electrolytes which are stable at normal operating conditions of the EDLC. Such stable electrolytes can include, for example, non-aqueous electrolytes that include a non-aqueous solvent such as, for example, acetonitrile or propylene carbonate, and a highly stable ionic species such as, for example a quaternary ammonium tetrafluoroborate salt. Known stable electrolytes can, however, become unstable under adverse operational conditions, for example, high voltage or high temperature conditions. As the demand for EDLC grows, there is a continuing need for new solvents and electrolyte systems that exhibit better stability and operational characteristics.

Thus, it is an enduring goal of EDLC development to develop new electrolyte formulations and EDLCs that have higher stability and longer life.

SUMMARY

Embodiments described herein relate generally to electric double layer capacitors having an electrolyte formulation that include a stabilizing additive such that the EDLCs retain cell capacitance for longer periods of time. in some embodiments, an electrolyte formulation suitable for use in energy storage devices, such as EDLCs, includes an ionic species, a solvent, and a stabilizer. In some embodiments, the solvent can be a nitrile compound and the stabilizer can be a compound of the formula I:

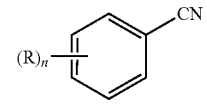

Such that R is H, saturated or unsaturated, linear or branched, acyclic carbon group, OH, halogen $NH_2$, $NO_2$, $-S(O)_2CF_3$, or monocyclic or polycyclic aryl, and n is an integer from 0 to 5.

The present disclosure is also directed to a method of improving the stability of an electric double-layer capacitor. The method involves using an electrolyte formulation which contains an ionic species, a solvent, and a stabilizer. In some embodiments, the stabilizer included in the electrolyte formulation improves the stability of the EDLC. In some embodiments, the stabilizer included in the electrolyte reduces capacitance loss, reduces ESR gain, and/or reduces the amount of gas generated by the EDLC over the course of operation of the EDLC.

Embodiments described herein are also related to a method of manufacturing an electric double layer capacitor. The method includes disposing a cathode on a positive current collector, and disposing an anode on a negative current collector. A separator is further disposed between the cathode and the anode to form an EDLC cell. The EDLC cell is disposed in a container and infiltrated with an electrolyte formulation which includes an ionic species, a solvent and a stabilizer. In some embodiments, the container can either be a prismatic container, a cylindrical container, or a flexible pouch container.

DETAILED DESCRIPTION

Figure 1:
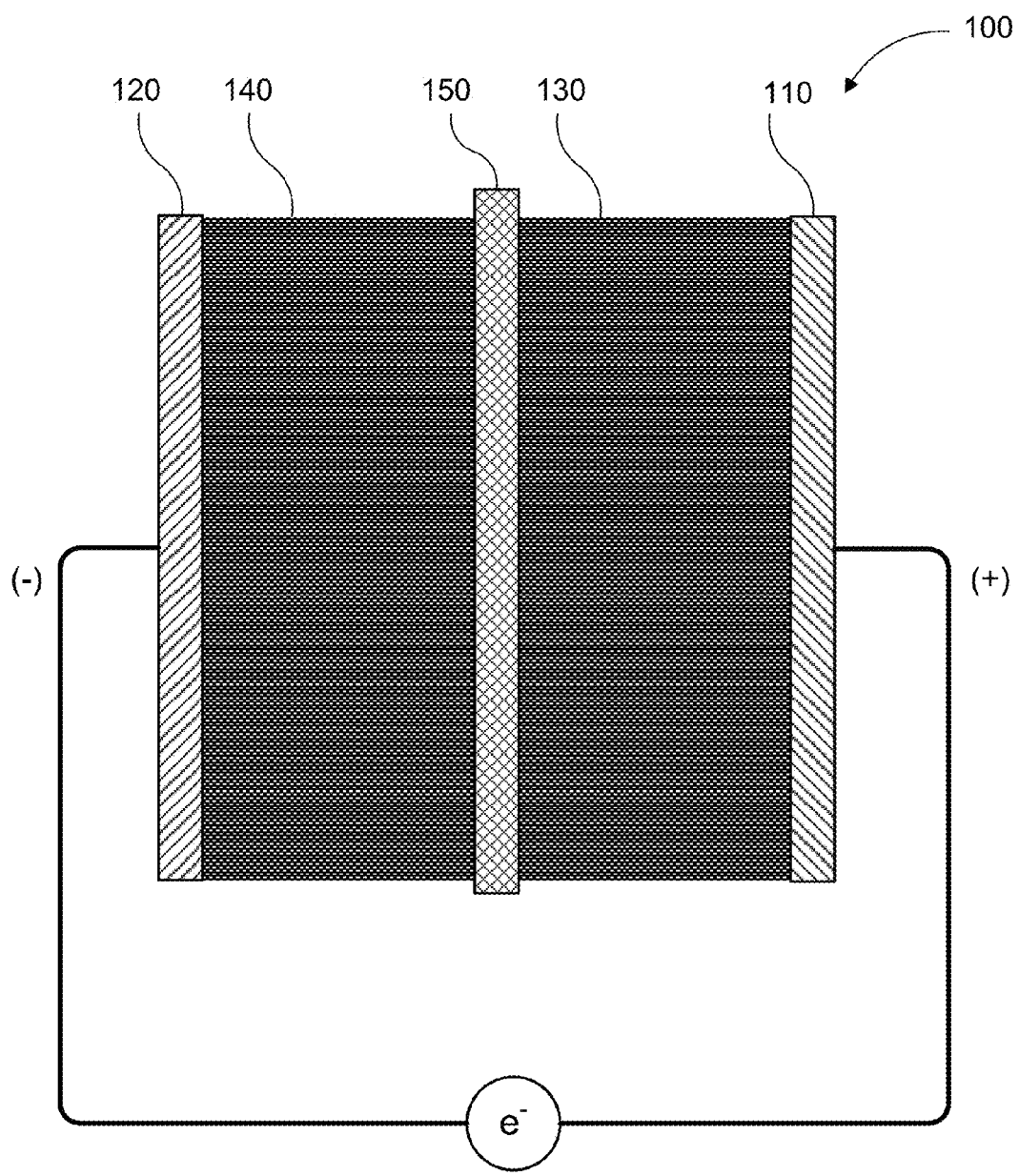
FIG. 1 is a schematic illustration of an EDLC according to an embodiment.

Known electrolytes used in EDLCs generally include an aqueous or a non-aqueous solvent that contains one or more dissolved ionic species, for example, an ionic salt. Some known aqueous electrolytes, for example, sulfuric acid or potassium hydroxide based aqueous electrolytes can be unstable at normal operating conditions of EDLCs, for example, at an operational voltage of the EDLC of less than about 2.5 volts. Such known aqueous electrolytes can, for example, be stabilized by addition of a stabilizer. Some non-aqueous electrolytes that are not based on highly stable solvents (e.g., acetonitrile) and/or are not based on a highly stable ionic species (e.g., a quaternary ammonium tetrafluoroborate salt) can become unstable at normal operating conditions of EDLCs, for example, at an operational voltage of less than about 2.7 volts. Such known non-aqueous electrolytes can, for example, also be stabilized by the addition of a stabilizer. In contrast, some known non-aqueous electrolytes can include solvents (e.g., acetonitrile) and ionic species (e.g., a quaternary ammonium tetrafluoroborate salt) that are highly stable at normal operating conditions, for example, at an operational voltage of the EDLC of less than 2.7 volts. Known non-aqueous electrolyte solvents can, however, become unstable at adverse operating conditions such as, for example, high operational voltage (e.g., greater than about 2.7 volts) and/or high temperature (e.g., greater than about 60 degrees Celsius). This can lead to degradation of the solvent and/or electrodes (i.e., cathode and anode) included in the EDLC which can reduce the capacitance of the EDLC, increase equivalent series resistance (ESR), and therefore reduce the cycle life of the EDLC. For example, acetonitrile has been known to lose stability at operational voltages greater than about 2.7 volts that can result in unacceptably high ESR rise and capacitance decrease. Furthermore, degradation of the solvents at adverse operating conditions can also lead to a higher quantity of generated gas which can mechanically deform the components of the EDLC, thereby reducing the EDLC life. As the demand for EDLCs that can operate at high voltages (e.g., greater than about 2.7 volts) increases, new electrolytes are required that can retain their stability at high operating voltages and/or temperatures.

Embodiments of electrolyte formulations described herein include a quantity of a stabilizer added to the solvent (e.g., a non-aqueous solvent) included in the electrolyte formulation, such that the stabilizer can slow down degradation of the electrolyte. Electrolyte formulations described herein provide several advantages including: (1) Reducing the rate of electrolyte degradation at high operating voltage and/or temperature and prevent the electrolyte from breaking down; (2) ameliorate rise in ESR of the EDLC; (3) increase the life of the EDLC by allowing the EDLC to retain a significant portion of its capacitance over long periods of operation and/or cycling; 4) scavenge water which can corrode electrodes and/or cause the EDLC to undergo catastrophic failure; 5) scavenge tertiary amines that can also lead to EDLC degradation; 6) complex metal impurities which can lead to better electronic performance; (7) reduce gas generation in the EDLC which can reduce mechanical deformation and physical damage, thereby increasing the life of the EDLC; and (8) use with very high capacitance EDLC, for example, EDLC having capacitance about 3,000 F or even higher. Therefore, EDLCs that include the electrolyte formulation described herein can be operated at a higher voltage (e.g., greater than about 2.7 volts) and/or temperature (e.g., greater than about 60 degrees) and have longer life.

In some embodiments, an electrolyte formulation suitable for use in energy storage devices, such as EDLCs, includes an ionic species, a solvent, and a stabilizer. In some embodiments, the solvent can be a nitrile compound (e.g., acetonitrile, propionitrile, butyronitrile, or combination thereof) and the stabilizer can be a compound of the formula I:

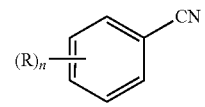

such that R is H, saturated or unsaturated, linear or branched, acyclic carbon group, OH, halogen $NH_2$, $NO_2$, $-S(O)_2CF_3$, or monocyclic or polycyclic aryl, and n is an integer from 0 to 5.

In some embodiments, an EDLC includes an electrolyte formulation which includes an ionic species, a solvent and a stabilizer. In some embodiments the solvent can be a nitrile compound (e.g., acetonitrile, propionitrile, butyronitrile, or combination thereof) and the stabilizer can be a compound of the formula I:

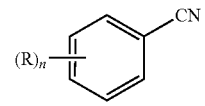

such that R is H, saturated or unsaturated, linear or branched, acyclic carbon group, OH, halogen $NH_2$, $NO_2$, $-S(O)_2CF_3$, or monocyclic or polycyclic aryl, and n is an integer from 0 to 5.

In some embodiments, a method of improving the stability of an EDLC includes using an electrolyte formulation which includes an ionic species, a solvent, and a stabilizer. In some embodiments, the electrolyte formulation improves the stability of the EDLC, or the stability of the EDLC is at least equivalent to the stability of an EDLC that does not include the electrolyte formulation described herein.

In some embodiments, a method of manufacturing an EDLC includes disposing a cathode on a positive current collector, and disposing an anode on a negative current collector. A separator is further disposed between the cathode and the anode to form an EDLC cell. The EDLC cell is disposed in a container and infiltrated with an electrolyte formulation which includes an ionic species, a solvent and a stabilizer. In some embodiments, the container can either be a prismatic container, a cylindrical container, or a flexible pouch container.

As used herein, the term "about" and "approximately" generally mean plus or minus 10% of the value stated, e.g., about 5 would include 4.5 to 5.5, about 1,000 would include 900 to 1,100.

As used herein, the term "stable", "unstable" and "stability" refer to the physical, chemical or electronic stability of the electrolyte and the EDLC formed therefrom.

FIG. 1 shows a schematic illustration of an EDLC 100. The EDLC 100 includes a positive current collector 110, a negative current collector 120, a cathode 130, an anode 140 and a separator 150 disposed between the cathode 130 and the anode 140. The EDLC is infused with an electrolyte formulation that includes an ionic species, a solvent, and a stabilizer as described herein.

The positive current collector 110 and the negative current collector 120 can be formed from any suitable material which is stable at the operating potentials of the cathode 130 and the anode 140 of the EDLC 100. For example, the positive current collector 110 and or the negative current collector 120 can be formed from aluminum, or aluminum coated with conductive material such as, for example, platinum, nickel, gold, conductive metal oxides (e.g., vanadium oxide), carbon, metal carbides, nickel, and nickel-chrome alloy to name a few, and can be in the form of sheets, foil (e.g., etched aluminum foil), mesh, or any combination thereof.

The cathode 130 and the anode 140 can be formed from any suitable material, for example, activated carbon, graphite, consolidated amorphous carbon, carbon aerogel, graphene, carbon nanotubes, any other suitable material or combination thereof. The cathode 130 and the anode 140 can be disposed on the positive current collector 110 and the negative current collector 120 respectively, for example, coated, casted, drop coated, pressed, roll pressed, or deposited using any other suitable method, and can further be calendared, for example into a jelly roll to form a cylindrical EDLC, or wound to form a prismatic EDLC.

The cathode 130 and the anode 140 are separated by the separator 150. The separator 150 can be formed from any suitable material capable of ion transport and can be in the form of a thin porous membrane or mat. Suitable separator materials include, for example, cellulose, polypropylene, poly(acrylonitrile), Kapton, woven glass fibers, woven ceramic fibers, polyolefin, poly(tetrafluoroethylene), or any other suitable separator material or combination thereof.

As described herein, the EDLC cathode 130 and the anode 140 are infused with an electrolyte formulation which includes an ionic species, a solvent, and a stabilizer, and can include an aqueous or non-aqueous electrolyte formulation. The electrolyte formulation is configured to be stable over various operational parameters, for example, the EDLC operating at a voltage range of about 1 volt to about 2.5 volt, about 2.5 volt to about 2.75 volt, and/or greater than about 2.75 volt. For example, the electrolyte formulation can be stable at the EDLC operating at a voltage of greater than about 3.0 volts, greater than about 3.2 volts, greater than about 3.4 volts, greater than about 3.6 volts, greater than about 3.8 volts, greater than about 4.0 volts, or greater than about 5.0 volts, inclusive of all ranges and values therebetween. Furthermore, in some embodiments, the electrolyte can be stable at high operating temperatures of the EDLC, for example, temperatures of greater than about 50 degrees Celsius, greater than about 60 degrees Celsius, greater than about 70 degrees Celsius, greater than about 80 degrees Celsius, greater than about 90 degrees Celsius, or greater than about 100 degrees Celsius, inclusive of all ranges and values therebetween. In some embodiments, the electrolyte can be stable at an operating voltage of greater than about 2.5 volts and an operating temperature of greater than about 75 degrees Celsius.

In some embodiments, the electrolyte formulation can be a non aqueous electrolyte formulation that includes a non-aqueous solvent. In some embodiments, the non-aqueous solvent can be a nitrile compound (e.g., acetonitrile, propionitrile, butyronitrile or a combination thereof), a carbonate compound (e.g., propylene carbonate, dimethyl carbonate, ethylene carbonate, ethyl methyl carbonate, diethyl carbonate, or a combination thereof), a sulfone compound, (e.g., sulfolane, dimethyl sulfone (DMSO), etc.), any combination thereof, or any other suitable non-aqueous solvent. The solvent, for example acetonitrile, can be operative to be stable at normal operating conditions of the EDLC (e.g., at operating potentials below about 2.7 volts and operating temperatures below about 60 degrees Celsius) but can become unstable at higher operating potentials or temperatures.

In some embodiments, the ionic species included in the electrolyte formulation can include a quaternary ammonium salt, for example, spiro-bipyrrolidinium tetrafluoroborate (SBP BF$_4$), tetraethylammonium tetrafluoroborate (TEA TFB), N-ethyl-N-methylpyrrolidinium tetrafluoroborate, triethyl(methyl)ammonium tetrafluoroborate, any other suitable ionic species, or any combination thereof.

In some embodiments, the stabilizer included in the electrolyte formulation can be a compound of formula I:

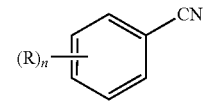

such that R is H, saturated or unsaturated, linear or branched, acyclic carbon group, OH, halogen, $NH_2$, $NO_2$, $-S(O)_2CF_3$, or monocyclic or polycyclic aryl, and n is an integer from 0 to 5. In some embodiments the stabilizer can be benzonitrile. The quantity of the stabilizer, for example benzonitrile, in the electrolyte formulation can be in the range of about 0.01% to about 10% by volume of the solvent, for example, acetonitrile, included in the electrolyte formulation. For example, in some embodiments, the quantity of the stabilizer can be about 0.01% to 1% by volume, 1% to about 9% by volume, about 2% to about 8% by volume, about 3% to about 7% by volume, about 4% to about 6% by volume, about 4.5% to about 5.5% by volume, about 0.5% to about 1.5% by volume, about 0.7% to about 1.3% by volume, about 0.9% to about 1.1% by volume, about 1.5% to about 2.5% by volume, about 1.7% to about 2.3% by volume, and about 1.9% to about 2.1% by volume of the solvent.

In some embodiments, the stabilizer can be operative to adsorb to the electrode, for example, cathode 130 and/or anode 140 surface and enhance the stability of the solvent, for example acetonitrile, included in the electrolyte formulation. Without being bound by theory, the aromatic group (i.e., the aromatic group) included in the stabilizer can have an affinity for the cathode 130 (e.g., activated carbon cathode) and/or anode 140 (e.g., activated carbon anode) surface, which can further increase when the electrodes are charged. Furthermore, the nitrile group included in the stabilizer gives the molecule a polar character making the stabilizer miscible with polar organic solvents, for example, acetonitrile and gives the stabilizer a high dielectric constant. The stabilizer can preferentially adsorb on the surface of the cathode 130 (e.g., activated carbon cathode) and/or anode 140 (e.g., activated carbon anode) reduce the contact between cathode 130 and/or anode 140 surface and the organic polar solvent, for example acetonitrile, thereby slowing down the solvent, for example acetonitrile, breakdown. In addition, the stabilizer can also undergo a chemical reaction, for example polymerization, at the cathode 130 surface and/or anode 140 surface, and form a thin protective layer which can slow further solvent breakdown. This can lead to enhanced stability of the electrolyte formulation and thereby, the EDLC such that EDLC can retain a significant portion of its capacitance for longer periods of operation, have lower increase in ESR, can be operated at high operating potentials and/or temperature, and has longer life (i.e., longer cycle life). In some embodiments, the electrolyte formulation described herein can have a conductivity and/or capacitance about equal to a conductivity and/or capacitance of an electrolyte formulation that does not include the stabilizer described herein.

In some embodiments, the electrolyte formulation described herein can also reduce the quantity of gas generated in the EDLC 100. This can reduce mechanical deformation of the components of the EDLC 100 (e.g., the cathode 130 and/or the anode 140) due to the pressure induced by the generated gas, thereby reducing physical damage and increasing the life of the EDLC 100.

In some embodiments, the electrolyte formulation can enable the EDLC 100 to have very high capacitance and reduce the quantity of gas generated in the EDLC. For example, the EDLC 100 that includes any of the electrolytes described herein can have a capacitance of about 100 F, 150 F, 200 F, 250 F, 300 F, 350 F, 400 F, 450 F, 500 F, 600 F, 700 F, 800 F, 900 F, 1,000 F, 1,200 F, 1,400 F, 1,600 F, 1,800 F, 2,000 F, 2,500 F, 3,000 F, 3,500 F, 4,000 F, 4,500 F, 5,000 F, 6,000 F, 7,000 F, 8,000 F, 9,000 F, 10,000 F, or even higher, inclusive of all ranges therebetween.

In some embodiments, the electrolyte formulation can enable the EDLC 100 to be operated at a high operating voltage of greater than about 2.5 volts. For example, the electrolyte formulation can enable the EDLC 100 to be operated at an operating voltage of greater than about 2.7 volts, greater than about 3.0 volts, greater than about 3.2 volts, greater than about 3.4 volts, greater than about 3.6 volts, greater than about 3.8 volts, greater than about 4.0 volts, or greater than about 5.0 volts, inclusive of all ranges and values therebetween.

In some embodiments, the electrolyte can be stable at high temperatures, such that the EDLC 100 can be operated a high operating temperature of greater than about 50 degrees Celsius. For example, the electrolyte 100 can enable the EDLC 100 to be operated an operating temperature greater than about 60 degrees Celsius, greater than about 70 degrees Celsius, greater than about 80 degrees Celsius, greater than about 90 degrees Celsius, or greater than about 100 degrees Celsius, inclusive of all ranges and values therebetween.

In some embodiments, the electrolyte can be stable at a high operating voltage and a high operating temperature such that, for example, the EDLC 100 can be operated at an operating voltage of greater than about 2.5 volts and an operating temperature of greater than about 75 degrees Celsius.

In some embodiments, a method for improving the stability of an EDLC can include using an electrolyte formulation which includes an ionic species, a solvent, and a stabilizer. The ionic species can be any suitable ionic species, for example SBP $BF_4$ or any other ionic species described herein. The solvent can be any suitable organic polar solvent, for example, acetonitrile, or any other solvent as described herein. The stabilizer can be a compound of formula I as described herein, for example, benzonitrile. In some embodiments, an EDLC formed using the method described herein can have a capacitance of at least about 100 F. The EDLC which includes the electrolyte formulation described herein can have a stability at least equivalent to a stability of an EDLC that does not include the electrolyte formulation described herein, for example, stable at an operating potential of greater than about 2.7 volts and temperature of less than about 60 degrees Celsius. In some embodiments, the EDLC which includes the electrolyte formulation described herein can be operated at an operating voltage of greater than about 2.5 volts and an operating temperature of greater than about 75 degrees Celsius. In some embodiments, the EDLC which includes the electrolyte formulation described herein can be operated at an operating voltage of greater than about 3.0 volts and an operating temperature of greater than about 50 degrees Celsius.

Figure 2:
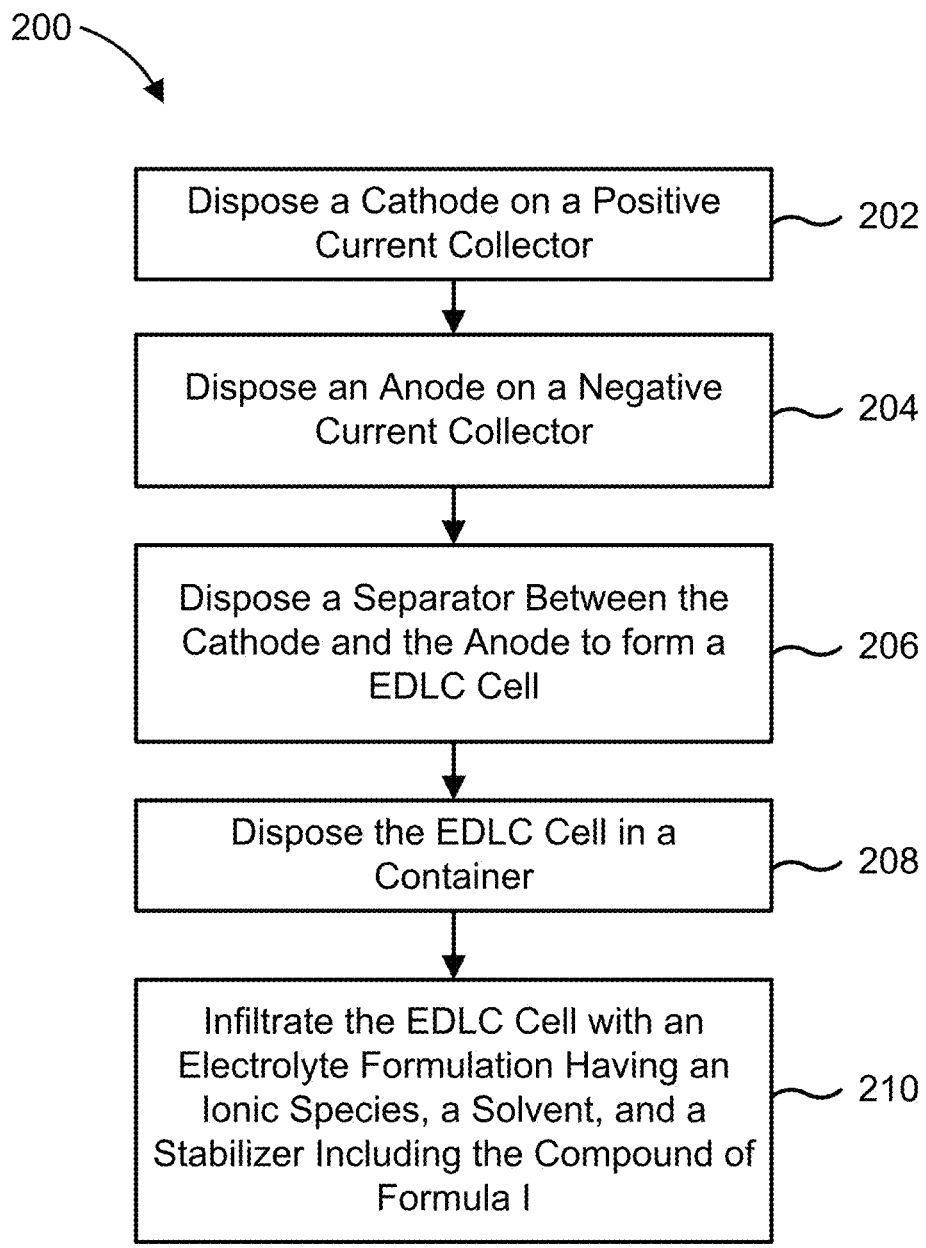
FIG. 2 shows a schematic flow diagram of a method of forming an EDLC, according to an embodiment.

FIG. 2 shows a schematic flow diagram illustrating an exemplary method of forming an EDLC 200, for example, the EDLC 100 or any other EDLC described herein. The method 200 includes disposing a cathode on a positive current collector, at 202. The cathode can be formed from activated carbon, graphite, consolidated amorphous carbon, carbon aerogel, graphene, carbon nanotubes, any other suitable material or combination thereof. The positive current collector can be formed from etched aluminum foil or any suitable material and can include the positive current collector 110 or any other positive current collector described herein. An anode is disposed on a negative current collector, at 204. The anode can be formed from activated carbon, graphite, consolidated amorphous carbon, carbon aerogel, graphene, carbon nanotubes, any other suitable material or combination thereof. The negative current collector can include the negative current collector 120 or any other negative current collector described herein. A separator is disposed between the cathode and the anode to form an EDLC cell, at 206. The separator can include the separator 150 or any other separator described herein. The EDLC cell can be calendared, for example into a jelly roll to form a cylindrical EDLC cell, or wound to form a prismatic EDLC. The EDLC cell is disposed in a container, at 208. The container can include a cylindrical container, a prismatic container e.g., a pouch), or any other suitable container. Finally, the EDLC cell is infiltrated with an electrolyte formulation having an ionic species, a solvent, and a stabilizer including the compound of formula I, at 210, and the container is sealed. In some embodiments, the ionic species included in the electrolyte formulation can include a quaternary ammonium salt, for example, spiro-bipyrrolidinium tetrafluoroborate (SBP $BF_4$), tetraethylammonium tetrafluoroborate (TEA TFB), N-ethyl-N-methylpyrrolidinium tetrafluoroborate, triethyl(methyl)ammonium tetrafluoroborate, any other suitable ionic species, or any combination thereof. In some embodiments, the solvent can include a non-aqueous solvent such as, for example, a nitrile compound (e.g., acetonitrile, propionitrile, butyronitrile or a combination thereof), a carbonate compound (e.g., propylene carbonate, diethyl carbonate, ethylene carbonate, ethyl methyl carbonate, diethyl carbonate), a sulfone compound (e.g., sulfolane, dimethyl sulfone (DMSO), etc.), any combination thereof, or any other suitable non-aqueous solvent. In some embodiments the stabilizer can include benzonitrile. In some embodiments, an EDLC formed using the method described herein can have a capacitance of at least about 100 F. In some embodiments, the EDLC which includes the electrolyte formulation described herein can be operated at an operating voltage of greater than about 2.5 volts and an operating temperature of greater than about 75 degrees Celsius. In some embodiments, the EDLC which includes the electrolyte formulation described herein can be operated at an operating voltage of greater than about 3.0 volts and an operating temperature of greater than about 50 degrees Celsius.

The following example shows the stability performance of an EDLC that includes the electrolyte formulation described herein. The EDLC was subjected to an "endurance test" (also known as "float test" or "durability test"). The endurance test includes application of a fixed voltage to the EDLC, which is the voltage at which the EDLC is to be rated, while holding the EDLC at an elevated temperature. The experimental parameters are chosen to accelerate electrochemical degradation of the EDLC. The capacitance and ESR of the EDLC are measured at room temperature before the endurance test begins, as well as at certain predetermined time intervals throughout the endurance test. For making measurements during the test, the EDLC is discharged and allowed to cool to room temperature before the EDLC capacitance and ESR are measured. The EDLC is then returned back to the accelerated degradation condition and the cycle repeated. Industry standards expect the EDLCs to have generally not lost more than about 20% of their initial capacitance after 1,000 hours of operation while ESR is expected to have not more than doubled by the 1,000 hour mark. These criteria however, might be relaxed for EDLCs operated at higher voltages, for example, at about 3 volts. It is widely accepted that systems that exhibit relatively high electrochemical stability throughout the endurance test will also exhibit relatively high electrochemical stability at other conditions that are not drastically different to those used in the test such as, for example, room temperature operation.

The EDLCs were also tested for the amount of gas generated in the EDLCs that include the electrolyte formulation described herein, at the endurance test conditions. In these examples, cylindrical EDLC cells were prepared and the increase in height of the cylindrical cells was measured which was attributed to the amount of gas generated in the EDLC.

These examples are only for illustrative purposes and are not intended to limit the scope of the present disclosure.

COMPARATIVE EXAMPLE 1

A first comparative EDLC (also referred to as "Comp. EDLC 1") was prepared from an activated carbon cathode and an activated carbon anode. Each of the anode and the cathode included an activated carbon loading of about 86% by weight. The dimensions of each of the cathode and the anode were about 40 mm by 40 mm. The positive current collector and the negative current collector were formed from etched aluminum foil. A separator was disposed between the cathode and the anode, and the Comp. EDLC 1 was packaged into an aluminum laminate pouch cell. The Comp. EDLC 1 electrodes were infused with an electrolyte formulation that included an acetonitrile solvent and 1 mole per liter of SBP $BF_4$ as the ionic species. The total water content of the electrolyte was less than about 50 ppm and about 1 ml of the electrolyte formulation was used. The Comp. EDLC 1 cells were assembled in a dry room which had a dew point of less than about −50 degrees Celsius. The electrodes were dried overnight at about 140 degrees Celsius under vacuum prior to cell assembly.

Two replicates of the Comp. EDLC 1 were prepared (referred to as "Comp. EDLC 1-1", and "Comp. EDLC 1-2") and subjected individually to the endurance test.

COMPARATIVE EXAMPLE 2

A second comparative EDLC cell (also referred to as "Comp. EDLC 2") was prepared from an activated carbon cathode and an activated carbon anode. Each of the anode and the cathode included an activated carbon loading of about 86% by weight. The positive current collector and the negative current collector were formed from etched aluminum foil. A separator was disposed between the cathode and the anode. The Comp. EDLC 2 was wound into a jelly roll and packaged into a cylindrical can. The Comp. EDLC 2 electrodes were infused with an electrolyte formulation that included an acetonitrile solvent and 1 mole per liter of SBP $BF_4$ as the ionic species. The total water content of the electrolyte was less than about 50 ppm and about 10 ml of the electrolyte formulation was used. The Comp. EDLC 2 cell was assembled in a dry room which had a dew point of less than about −50 degrees Celsius. The jelly rolls were dried overnight at about 140 degrees Celsius under nitrogen prior to cell assembly.

Four replicates of the Comp. EDLC 2 were prepared (referred to as "Comp. EDLC 2-1", "Comp. EDLC 2-2", "Comp. EDLC 2-3", and "Comp. EDLC 2-4") and were tested individually for the increase in height of each of the EDLC 2 cylindrical cells due to gas generation at the endurance test conditions.

COMPARATIVE EXAMPLE 3

A third comparative EDLC cell (also referred to as "Comp. EDLC 3") was prepared from an activated carbon cathode and an activated carbon anode. Each of the anode and the cathode included an activated carbon loading of about 86% by weight. The positive current collector and the negative current collector were formed from etched aluminum foil. A cellulose separator was disposed between the cathode and the anode. The Comp. EDLC 3 was wound into a jelly roll which was dried for 12 hours under vacuum at 140 degrees Celsius and then packaged into a cylindrical can. The Comp. EDLC 3 cell was assembled in a dry room which had a dew point of less than about −50 degrees Celsius. The cylindrical cans and end caps were formed from aluminum alloy. The dimensions of the Comp. EDLC 3 cell as defined by the dimensions of the can which were about 144 mm in length and about 60 mm in diameter. The Comp. EDLC3 electrodes were infused with an electrolyte formulation that included an acetonitrile solvent and 1 mole per liter of SBP $BF_4$ as the ionic species. The total water content of the electrolyte was less than about 50 ppm and about 10 ml of the electrolyte formulation was used.

Two replicates of the Comp. EDLC 3 were prepared (referred to as "Comp. EDLC 3-1", and "Comp. EDLC 3-2") and were subjected individually to the endurance test. Each Comp. EDLC 3 had a capacitance of about 3000 F.

EXAMPLE 1

A first EDLC (also referred to as "EDLC 1") was prepared similar to EDLC 1 but now benzonitrile in a quantity of about 1% by volume of acetonitrile was included in the electrolyte formulation. Two replicates of the EDLC 1 were prepared (referred to as "EDLC 1-1", and "EDLC 1-2") and subjected individually to the endurance test.

EXAMPLE 2

A second EDLC (also referred to as "EDLC 2") was prepared similar to Comp. EDLC 2 but now benzonitrile in a quantity of about 1% by volume of acetonitrile was included in the electrolyte formulation. Four replicates of the EDLC 2 were prepared (referred to as "EDLC 2-1", "EDLC 2-2", "EDLC 2-3", and "EDLC 2-4") and were tested individually for the increase in height of each of the EDLC 2 cylindrical cells due to gas generation at the endurance test conditions.

EXAMPLE 3

A third EDLC (also referred to as "EDLC 3") was prepared similar to Comp. EDLC 2 but now benzonitrile in a quantity of about 2% by volume of acetonitrile was included in the electrolyte formulation. Four replicates of the EDLC 3 were prepared (referred to as "EDLC 3-1", "EDLC 3-2", "EDLC 3-3", and "EDLC 3-4") and were tested individually for the increase in height of each of the EDLC 3 cylindrical cells due to gas generation at the endurance test conditions.

EXAMPLE 4

A fourth EDLC (also referred to as "EDLC 4") was prepared similar to Comp. EDLC 2 but now benzonitrile in a quantity of about 5% by volume of acetonitrile was included in the electrolyte formulation. Three replicates of the EDLC 4 were prepared (referred to as "EDLC 4-1", "EDLC 4-2", and "EDLC 4-3") and were tested individually for the increase in height of each of the EDLC 4 cylindrical cells due to gas generation at the endurance test conditions.

EXAMPLE 5

A fifth EDLC (also referred to as "EDLC 5") was prepared similar to Comp. EDLC 3 but now benzonitrile in a quantity of about 5% by volume of acetonitrile was included in the electrolyte formulation. For example, such an electrolyte can be prepared by adding about 0.2 liters of benzonitrile to about 4.0 liters of 1 mole per liter SBP $BF_4$. If anhydrous benzonitrile is used, the water content of the electrolyte is not significantly affected by the benzonitrile. The addition of the benzonitrile has a diluting effect such that the final concentration of SBP $BF_4$ is slightly less than 1 mole per liter. Two replicates of the EDLC 5 were prepared (referred to as "EDLC 5-1", "EDLC 5-2") and were subjected to the endurance test. The capacitance of each of the EDLC 5 cells was about 3000 F.

Endurance testing of each of the Comp. EDLC 1 cells and EDLC 1 cells were performed at a voltage of about 3.0 volts and a temperature of about 65 degrees Celsius. Each of the Comp. EDLC 1 cells and the EDLC 1 cells were conditioned for about 18 hours at the experimental conditions (about 3.0 volts at about 65 degrees Celsius) before starting the endurance test. The capacitance and ESR after the conditioning period were taken as the starting point and all calculations of capacitance loss or ESR gain were performed relative to this starting point which is shown at 0 hours on the x-axis of the plots of FIG. 3 and FIG. 4.

Figure 3:
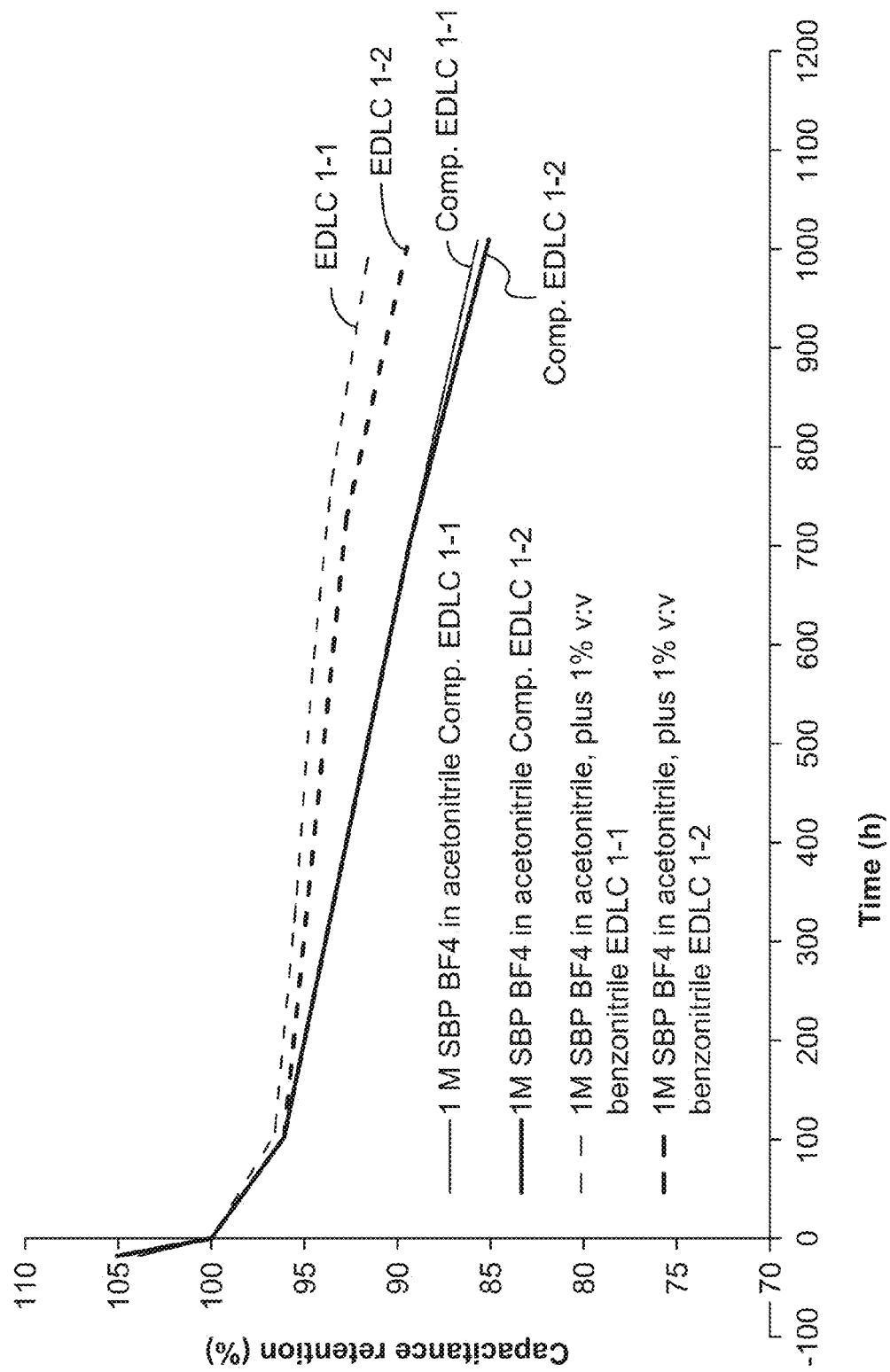
FIG. 3 shows percentage of capacitance retained by EDLCs that include the electrolyte formulations described herein, compared to EDLCs that do not include the electrolyte formulations described herein, when subjected to an endurance test.
Figure 4:
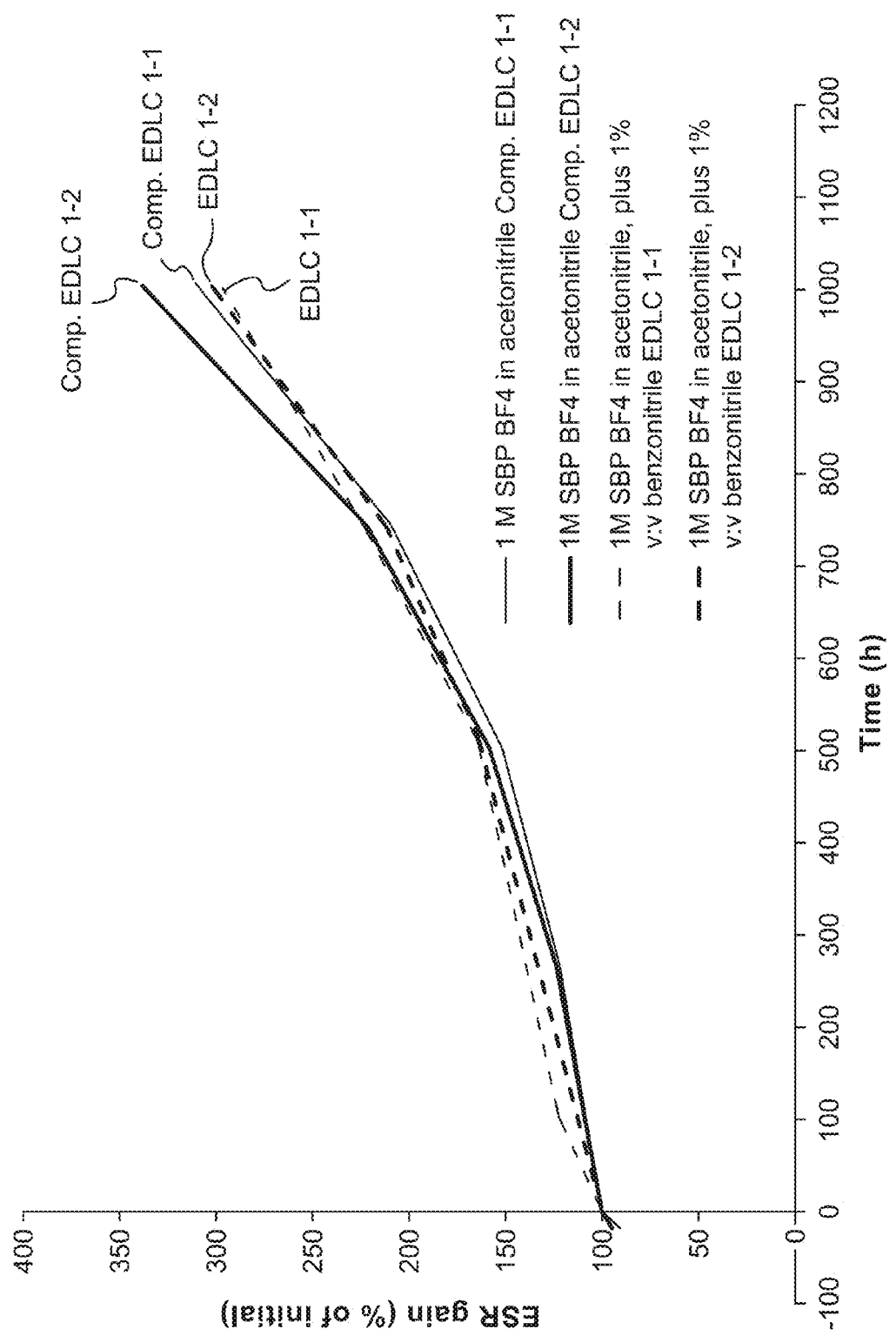
FIG. 4 shows increase in ESR of the EDLCs that include the electrolyte formulations described herein, compared to EDLCs that do not include the electrolyte formulations described herein, when subjected to an endurance test.

FIG. 3 shows a plot of percentage of capacity retained by each of the Comp. EDLC 1 cells and EDLC 1 cells after about 1,000 hours of operation at the endurance test condition. FIG. 4 shows a plot of percentage of ESR increase after about 1,000 hours of operation, where the initial ESR is taken as 100%. Specifically, ESR measurements were taken at times proximal to 0, 100, 250, 500, 750, ad 1,000 hours of operation. As shown in FIG. 3, Comp. EDLC 1-1 and Comp. EDLC 1-2 which do not include the benzonitrile stabilizer in the electrolyte formulation retain about 86% of their initial capacitance after about 1,000 hours of operation at the accelerated electrochemical degradation conditions of the endurance test. In contrast, EDLC 1-1 and EDLC 1-2 which include the benzonitrile stabilizer in the electrolyte formulation retain about 92% and about 90% of their initial capacitance, respectively, clearly demonstrating that the EDLC 1-1 and EDLC 1-2 has longer life. Typically, current 2.7 V cells or capacitors with voltage and performance similar to these cells are expected to not have lost more than 20% of their capacitance after 1,000 hours of operation. The experimental results of FIGS. 3 and 4 show that the electrolyte formulation described herein is more stable such that EDLCs (i.e., EDLC 1-1 and EDLC 1-2) formed therefrom can be operated at higher operating voltages (e.g., greater than about 3.0 volts), higher temperatures (e.g., greater than about 50 degrees Celsius), and have longer life. Furthermore, as shown in FIG. 4 the gain in the ESR of both of the Comp. EDLC 1-1, Comp. EDLC 1-2 and EDLC 1-1 and EDLC 1-2 is about the same or slightly improved.

Figure 5:
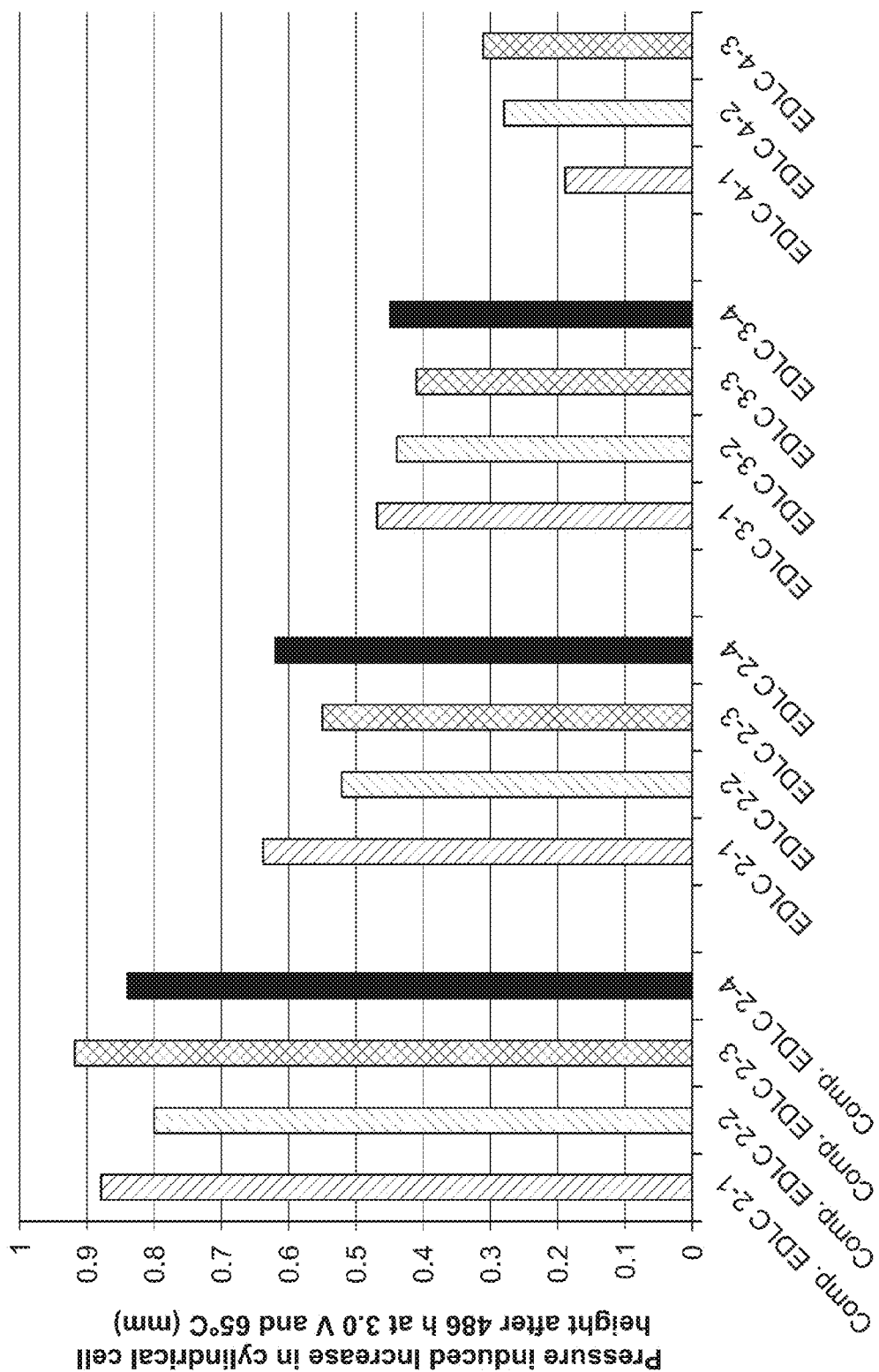
FIG. 5 shows increase in cylindrical cell height of EDLCs that include the electrolyte formulation described herein, due to pressure induced by gas generated within the EDLCs.

Each of the Comp. EDLC 2 cells, the EDLC 2, the EDLC 3, and the EDLC 4 cells were tested for increase in height of the cylindrical cells due to gas generation. Higher gas generation should lead to a larger increase in the height of the cylindrical cell due to a higher gas pressure. A potential of about 3.0 volts was applied to each of the EDLC cells, while holding the cells at a temperature of about 65 degrees Celsius (the endurance test conditions) for a time period of about 486 hours. The potential was then removed, the EDLC cells were cooled to room temperature and the increase in the height of each of the EDLC cells was determined. FIG. 5 shows a bar graph of the increase in height of each of the cylindrical EDLC cells induced by pressure due to gas generated within the EDLC cells. As shown in FIG. 5, the Comp. EDLC 2 cells had an average increase in cylindrical cell height of about 0.86 mm. In contrast, the EDLC 2 cells had an average increase in cylindrical cell height of about 0.58 mm, the EDLC 3 cells had an average increase in cylindrical cell height of about 0.45 mm, and the EDLC 4 cells had an average increase in cylindrical cell height of about 0.26 mm.

This clearly shows that EDLCs that include the electrolyte formulation described herein (i.e., electrolyte formulation which includes a benzonitrile or any of the stabilizers described herein) generate a lower quantity of gas in comparison with EDLCs that do not include the electrolyte formulation described herein. Furthermore, the reduction in gas generation is proportional to the quantity of stabilizer in the electrolyte formulation.

Figure 6:
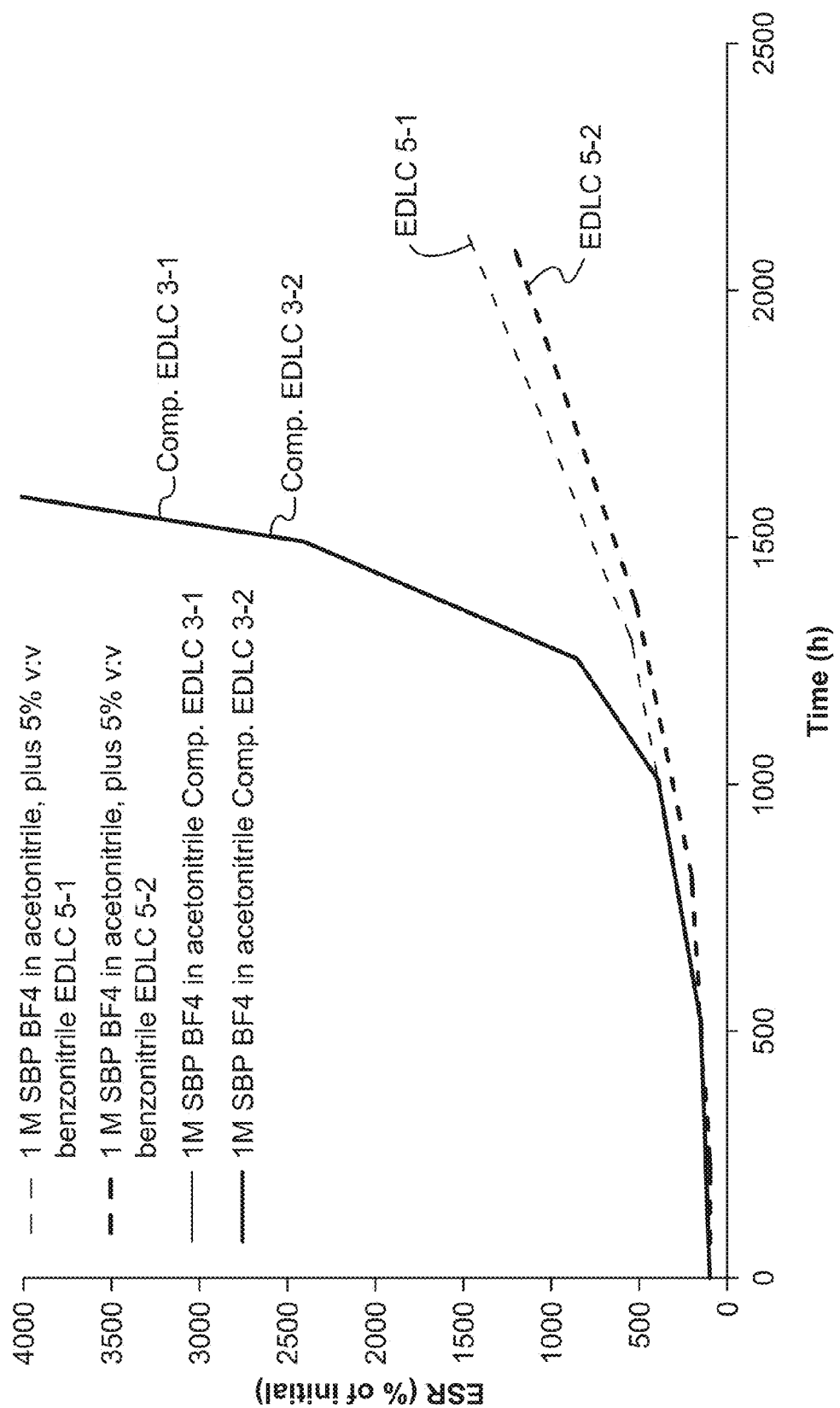
FIG. 6 shows increase in ESR of EDLCs having a capacitance of about 3000 F and that include the electrolyte formulations described herein, compared to EDLCs having a capacitance of about 3000 F but do not include the electrolyte formulations described herein, when subjected to an endurance test.
Figure 7:
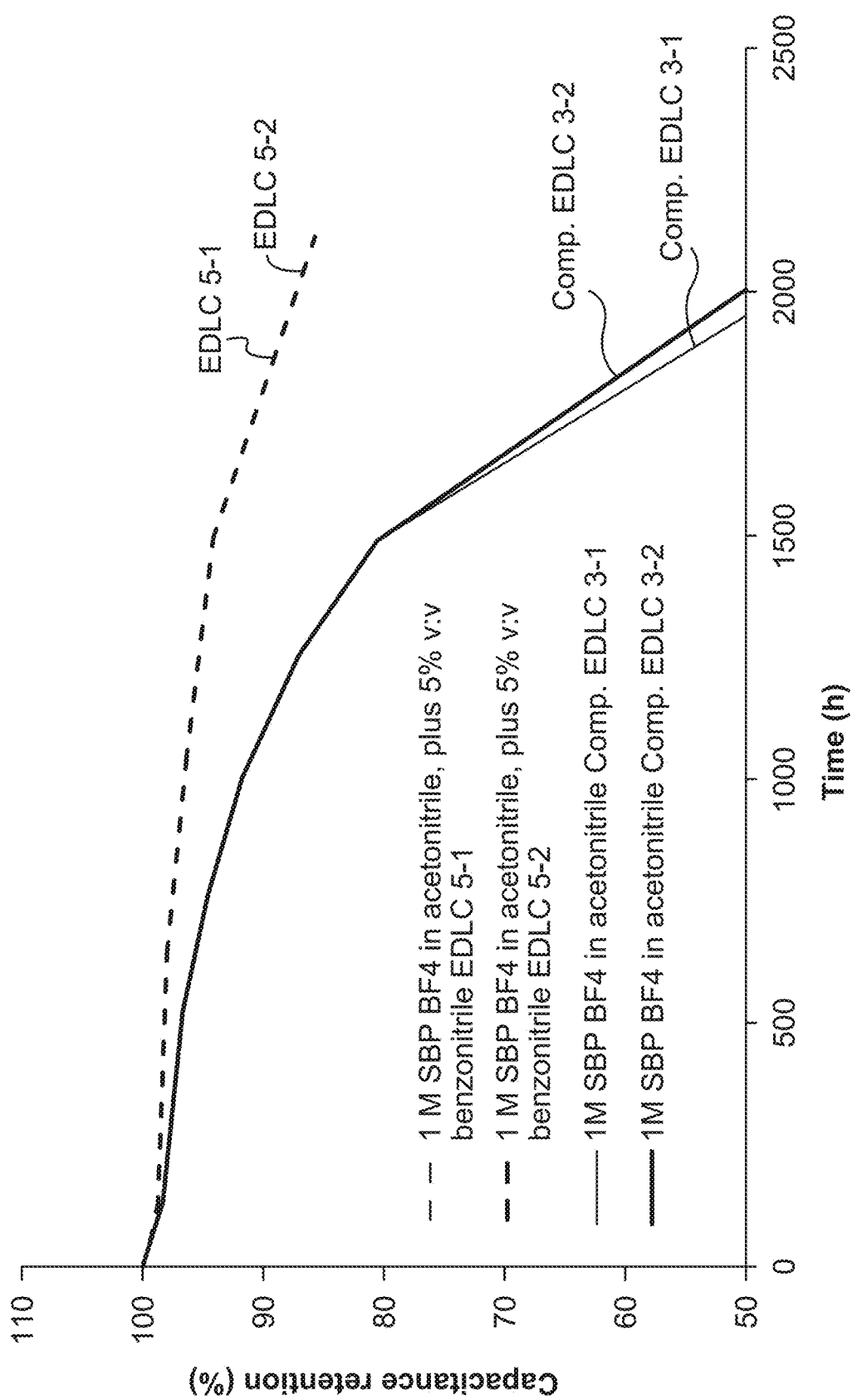
FIG. 7 shows capacitance retained by the EDLCs of FIG. 6 over the duration of the endurance test.

FIG. 6 and FIG. 7 show results of endurance tests performed on the Comp. EDLC 3 cells and EDLC 5 cells. Each of the cells was conditioned for about 92 hours prior to performing the endurance test. The conditioning was performed by holding the cells at 3.0 volts and 65 degrees Celsius for about 92 hours. Once conditioned, each of the cells was subjected to the endurance test. A potential of about 3.0 volts was applied to each of the cells, while holding the cells at a temperature of about 65 degrees Celsius (the endurance test conditions). The ESR and the capacitance of the cells were measured periodically at about 0 hour, 100 hours, 200 hours, 500 hours, 750 hours, 1,000 hours, 1,250 hours, 1,500 hours, and 2,100 hours into the test. The cells were discharged and allowed to cool to room temperature by allowing the cells to rest for about 3 hours before the ESR and capacitance were measured. After a measurement was taken, the cells were returned to the endurance test conditions.

The ESR was measured by discharging the cells from 3.0 volts, which was preceded by a 10 minute hold at a voltage of 3.0 volts, at 50 amperes. In the discharge voltage curve (i.e., the voltage vs time curve), a line from time=1 second, and time=3 seconds is extrapolated back to time=0. The y-intercept at time=0 is subtracted from the maximum voltage of 3.0 volts, and this difference is taken as the voltage drop. This voltage is used to calculate the ESR via Ohm's law, which is the standard procedure used in industry to determine ESR. As shown in FIG. 6, the EDLC 5-1 demonstrated an ESR gain of about 1,500% of initial ESR, and the EDLC 5-2 demonstrated an ESR gain of about, 1,200% of initial ESR, after about 2,100 hours of the endurance test. This was much lower than the Comp. EDLC 3 cells (the EDLC 3-1 and EDLC 3-2 cells) which demonstrated an ESR gain of about 4,000% of initial ESR after only about 1,500 hours of the endurance test. This shows that the EDLC cells including an electrolyte formulation that includes the benzonitrile additive can have a substantially lower increase in ESR relative to initial ESR as compared to conventional EDLCs that include electrolyte formulations that do not include the benzonitrile additive.

The capacity retained by each of the Comp. EDLC 3 cells and the EDLC 5 cells over the period of the endurance test are shown in FIG. 7. The capacitance retained by the cells was measured by discharging the cells from 3.0 volts to 0.1 volts at a discharge current of 50 amperes. Each discharge was preceded by a 10 minute hold at a voltage of about 3.0 volts. The capacitance measurements shown in FIG. 7 show the capacitance in the voltage range of 2.4 volts to 1.2 volts which represents the discharge from 80% to 40% of the rated value of the cells of about 3.0 volts, which is the range commonly used in industry for measuring capacitance. As shown in FIG. 7 the EDLC 5-1 and EDLC 5-2 cells retain about 85% of their initial capacitance after about 2,100 hours of the endurance test. In comparison, the capacitance of the Comp. EDLC 3 cells drops to about 50% of the initial capacitance after about 2,000 hours into the endurance test. This shows that the EDLC cells including an electrolyte that includes the benzonitrile additive retain a substantially larger portion of their capacitance compared to conventional EDLCs that include electrolyte formulations that do not include the benzonitrile additive.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. For example, while the electrolyte formulation described herein was described as including an ionic species, a solvent, and a stabilizer, in some embodiments, the electrolyte formulation can also included a polymeric species (e.g., a gel polymer). Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrolyte formulation suitable for use in an energy storage device, said formulation comprising an ionic species, a solvent including a nitrile compound, and a stabilizer comprising a compound of formula I:

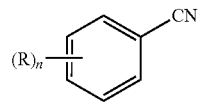

wherein:

R is H, a saturated or unsaturated, a linear or branched, acyclic carbon group, OH, a halogen, $NH_2$, $NO_2$, $S(O)_2CF_3$, or a monocyclic or polycyclic aryl, and n is an integer from 0 to 5.

2. The formulation of claim 1, wherein R is at least one of H, the saturated acyclic carbon group.

3. The formulation of claim 1, wherein R is at least one of the saturated, linear or branched acyclic carbon group, OH, the halogen, $NH_2$, $NO_2$, $S(O)_2CF_3$, and the monocyclic or polycyclic aryl.

4. The formulation of claim 1, wherein the stabilizer is benzonitrile.

5. The formulation of claim 1, wherein the nitrile compound includes at least one of acetonitrile, propionitrile, and butyronitrile.

6. The formulation of claim 5, wherein the nitrile compound is acetonitrile.

7. The formulation of claim 1, wherein the energy storage device is an electric double layer capacitor.

8. The formulation of claim 7, wherein the energy storage device has an operating voltage of greater than about 3 volts.

9. The formulation of claim 7, wherein the energy storage device has an operating temperature of greater than about 50 degrees Celsius.

10. The formulation of 7, wherein the energy storage device has an operating voltage of greater than about 2.5 volts, and an operating temperature of greater than about 75 degrees Celsius.

11. The formulation of claim 7, wherein the electric double layer capacitor has a capacitance of at least about 100 F.

12. The formulation of claim 1, wherein the ionic species is a quaternary ammonium salt.

13. The formulation of claim 12, wherein the quaternary ammonium salt includes at least one of spiro-bipyrrolidinium tetrafluoroborate (SBP $BF_4$), tetraethylammonium tetrafluoroborate (TEA TFB), N-ethyl- N-methylpyrrolidinium tetafluoroborate, and triethyl(methyl)ammonium tetrafluoroborate.

14. The formulation of claim 13, wherein the quaternary ammonium salt is spiro-bipyrrolidinium tetrafluoroborate (SBP $BF_4$).

15. An electric double-layer capacitor comprising:

an electrolyte formulation comprising an ionic species, a solvent, and a stabilizer comprising a compound of the formula I:

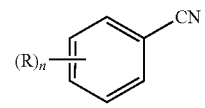

wherein:

R is H, a saturated or unsaturated, a linear or branched, acyclic carbon group, OH, a halogen, $NH_2$, $NO_2$, $S(O)_2CF_3$, or a monocyclic or polycyclic aryl, and n is an integer from 0 to 5.

16. The electric double-layer capacitor of claim 15, wherein the stabilizer is benzonitrile.

17. The electric double-layer capacitor of claim 16, wherein the solvent is a nitrile compound.

18. The electric double-layer capacitor of claim 17, wherein the nitrile compound includes at least one of acetonitrile, propionitrile, or butyronitrile.

19. The electric double layer capacitor of claim 18, wherein the nitrile compound is acetonitrile.

20. The electric double layer capacitor of claim 15, wherein the ionic species includes at least one of spiro-bipyrrolidinium tetrafluoroborate (SBP BF$_4$), tetraethylammonium tetrafluoroborate (TEA TFB), N-ethyl-N-methylpyrrolidinium tetafluoroborate, and triethyl(methyl) ammonium tetrafluoroborate.

21. The electric double layer capacitor of claim 20, wherein the ionic species is spiro-bipyrrolidinium tetrafluoroborate (SBP BF$_4$).

22. The electric double layer capacitor of claim 15, having a capacitance of at least about 100 F.

23. The electric double layer capacitor of claim 22, having a capacitance of at least about 300 F.

24. The electric double layer capacitor of claim 23, having a capacitance of at least about 1,200 F.

25. The electric double layer capacitor of claim 24, having a capacitance of at least about 2,000 F.

26. The electric double layer capacitor of claim 25, having a capacitance of at least about 3,000 F.

27. The electric double layer capacitor of claim 15, having an operating voltage of greater than about 2.7 volts.

28. The electric double layer capacitor of claim 27, having an operating voltage of greater than about 3 volts.

29. The electric double layer capacitor of claim 15 having an operating temperature of greater than about 50 degrees Celsius.

30. The electric double layer capacitor of claim 15, having an operating voltage of greater than about 2.5 volts and an operating temperature of greater than about 75 degrees Celsius.

31. A method of manufacturing an EDLC cell, the method comprising;
    disposing a cathode on a positive current collector;
    disposing an anode on a negative current collector;
    disposing a separator between the positive current collector and the negative current collector to form the EDLC cell;
    disposing the EDLC cell in a container; and
    infiltrating the EDLC cell with an electrolyte formulation, the electrolyte formulation comprising an ionic species, a solvent, and a stabilizer comprising the compound of formula I:

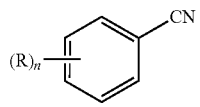

wherein:
R is H, a saturated or unsaturated, a linear or branched, acyclic carbon group, OH, a halogen, NH$_2$, NO$_2$, S(O)$_2$CF$_3$, or a monocyclic or polycyclic aryl, and
n is an integer from 0 to 5.

32. The method of claim 31, wherein the stabilizer is benzonitrile.

33. The method of claim 31, wherein the solvent includes at least one of acetonitrile, propionitrile, and butyronitrile.

34. The method of claim 33, wherein the solvent is acetonitrile.

35. The method of claim 31, wherein the ionic species is at least one of spiro-bipyrrolidinium tetrafluoroborate (SBP BF$_4$), tetraethylammonium tetrafluoroborate (TEA TFB), N-ethyl-N-methylpyrrolidinium tetafluoroborate, and triethyl(methyl)ammonium tetrafluoroborate.

36. The method of claim 35, wherein the ionic species is spiro-bipyrrolidinium tetrafluoroborate (SBP BF$_4$).

37. The method of claim 31, wherein the EDLC cell has a capacitance of at least about 100 F.

38. The method of claim 31, wherein the EDLC cell has an operating voltage of greater than about 3 volts.

39. The method of claim 31, wherein the EDLC cell has an operating temperature of greater than about 50 degrees Celsius.

40. The method of claim 31, wherein the EDLC cell has an operating voltage of greater than about 2.5 volts and an operating temperature of greater than about 75 degrees Celsius.

41. An electrolyte formulation suitable for use in an electric double layer capacitor, said electrolyte formulation comprising:
    an ionic species;
    a solvent including a carbonate compound, the carbonate compound including at least one of propylene carbonate, ethylene carbonate, dimethyl carbonate, ethyl methyl carbonate, and diethyl carbonate; and
    a stabilizer comprising a compound of formula I:

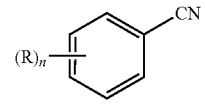

wherein:
R is H, a saturated or unsaturated, a linear or branched, acyclic carbon group, OH, a halogen, NH$_2$, NO$_2$, S(O)$_2$CF$_3$, or a monocyclic or polycyclic aryl, and
n is an integer from 0 to 5.

42. The electrolyte formulation of claim 41, wherein the carbonate compound is propylene carbonate.

43. The electrolyte formulation of claim 41, wherein the electric double layer capacitor has an operating voltage of greater than about 3 volts.

44. The electrolyte formulation of claim 41, wherein the electric double layer capacitor has an operating temperature of greater than about 50 degrees Celsius.

45. The electrolyte formulation of 41, wherein the electric double layer capacitor has an operating voltage of greater than about 2.5 volts, and an operating temperature of greater than about 75 degrees Celsius.

46. The electrolyte formulation of claim 41, wherein the electric double layer capacitor has a capacitance of at least about 100 F.

47. The electrolyte formulation of claim 41, wherein the ionic species is a quaternary ammonium salt.

48. The electrolyte formulation of claim 47, wherein the quaternary ammonium salt includes at least one of spiro-bipyrrolidinium tetrafluoroborate (SBP BF$_4$), tetraethylammonium tetrafluoroborate (TEA TFB), N-ethyl-N-mthylpyrrolidinium tetafluoroborate, and triethyl(methyl)ammonium tetrafluoroborate.

49. The electrolyte formulation of claim 48, wherein the quaternary ammonium salt is spiro-bipyrrolidinium tetrafluoroborate (SBP BF$_4$).

* * * * *